(12) United States Patent
Nova

(10) Patent No.: US 6,589,421 B1
(45) Date of Patent: Jul. 8, 2003

(54) FILTERING DEVICE

(75) Inventor: Andre Schiavon Villa Nova, Jaboticabal (BR)

(73) Assignee: Ceramica Stefani S/A. (BR)

( * ) Notice: Subject to any disclaimer, the term of this patent is extended or adjusted under 35 U.S.C. 154(b) by 19 days.

(21) Appl. No.: 09/606,203

(22) Filed: Jun. 29, 2000

(30) Foreign Application Priority Data

Jul. 9, 1999 (BR) .............................................. 9902671

(51) Int. Cl.$^7$ .............................................. B01D 36/02
(52) U.S. Cl. .................... 210/257.1; 210/259; 210/266; 210/282; 210/288; 210/460
(58) Field of Search ................. 210/282, 288, 210/449, 257.1, 259, 266, 460

(56) References Cited

U.S. PATENT DOCUMENTS 3,319,791 A  *  5/1967 Horne ........................ 210/288
4,814,078 A  *  3/1989 Stern et al. ................ 210/288
5,510,027 A  *  4/1996 Tejeda .......................... 210/282

* cited by examiner

Primary Examiner—Ivars Cintins
(74) Attorney, Agent, or Firm—Smith, Gambrell & Russell, LLP

(57) ABSTRACT

A filtering device (1), and particularly a filtering device (1), applied to a filter for home water purification is disclosed. The object of this invention is to provide a water filter of a device (1) which improves the efficiency in the water filtration accomplished by ceramic cores (10), thus eliminating the need of employing carbon filled cores or further elements for the filtration (2), and which, in addition, also enables the replacement of the element (1) without the need to replace the core (10). Such object is attained by a filtering device (1), adaptive to a filtering core (10) to be used in a water filter, the core (10) having a tubular projection (14), the device (1) comprising a recipient (3) filled with filtering elements (2), the recipient (3) being associated to a tubular projection (14) and trapping the water previously filtered by the core (10).

28 Claims, 1 Drawing Sheet

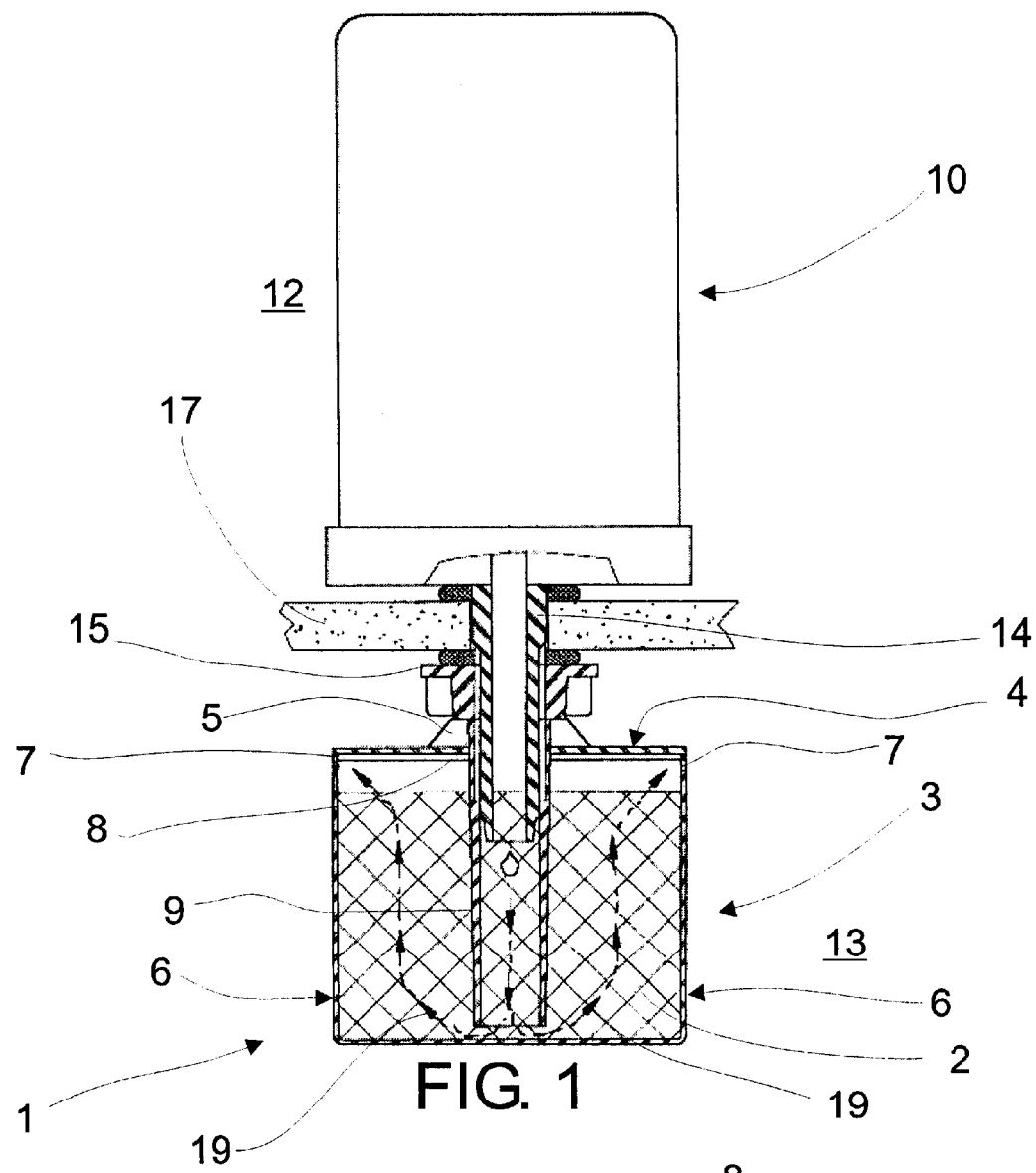
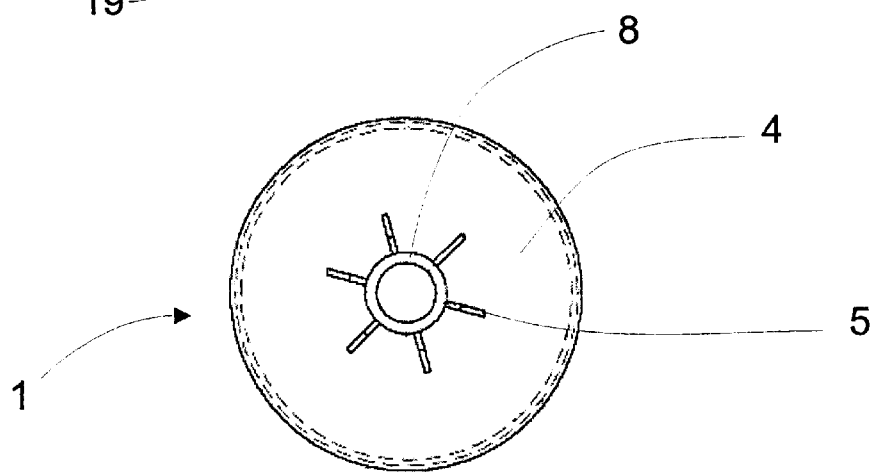

FILTERING DEVICE

The present invention is directed to a filtering device and, particularly, to a filtering device applied to a filter for purifying home water.

DESCRIPTION OF THE STATE OF THE ART

The most common types of water filter found in the market are usually manufactured from clay, which is a particularly suitable material, since it keeps the temperature of water lower when compared to other materials.

Such filters comprise basically an upper reservoir and a lower reservoir, the upper reservoir being suitable for storing the water to be filtered and the lower reservoir being suitable for storing the filtered water. The most common construction in this type of filter is in the form of substantially cylindrical reservoirs, the upper reservoir being a body having a lid and a base which is usually flat and suitable to be supported upon the upper edge of the lower reservoir which, in turn, is in the shape of a cup having a support base in addition to a tap for the outflow of the filtered water.

A filtering member, also known as filter core, which comprises a substantially cylindrical hollow body usually manufactured from porous ceramic and which is attached to the inner lower portion of the upper reservoir through a usually threaded tubular projection and manufactured from plastic material. Said core is submerged in the water inside the upper reservoir.

The water purification is accomplished when the water, due to the gravity, is urged from the upper reservoir through the micropores of the core walls towards the lower reservoir and in such a way that it prevents the particles contained in the water from reaching the lower reservoir.

Since the most common type of core, manufactured from ceramic only, does not provide a suitable filtration, it is envisaged the filling of the hollow body thereof with activated carbon and other elements which complement the filtration, so that, when passing through the micropores, the water can be further purified by said carbon and the other elements, resulting in a purer water for consumption. The main purpose of the carbon is to prevent the chemical contamination, the taste of chlorine, as well as bacteria.

To enable this type of construction, that is, a core filled with carbon, it should be provided with a screen positioned at the output of said tubular projection the purpose of which is to prevent the passage of the activated carbon particles and the other elements which complement the filtration to the lower reservoir.

This type of core reduces the problem of unsatisfactory filtration of the common cores, however, it brings about a problem that prevents such construction from having a good yield. The problem occurs due to both the composition and functioning of the core, that is, in view of the fact that the water passes through the ceramic walls and flows only along the internal walls thereof, the water contacts only the carbon and the other elements closely in contact with said internal walls of the core, the most part, or the substantially central part of the carbon and the other filtering elements being accordingly useless.

The result of this problem is that the carbon and the other elements which complement the water filtration which are effectively used in this type of construction, saturate quickly, thus requiring a more frequent replacement of the core.

OBJECTS AND BRIEF DESCRIPTION OF THE INVENTION

The object of this invention is to provide a water filter of a device that improves the efficiency in the water filtration carried out by ceramic cores, thus eliminating the need to use cores filled with activated carbon or further elements to accomplish the filtration, and which, moreover, also can be replaced without having to replace the core.

Such object is attained through a filtrating device, adaptive to a filtering core to be used in a water filter, the core having a tubular projection, the device comprising a recipient filled with filtering elements, the recipient being associated to the tubular projection and trapping the water previously filtered by the core.

BRIEF DESCRIPTION OF THE DRAWINGS

This invention will be described below in further details based on an example of realization represented in the drawings.

FIG. 1—a partial view in section of the upper reservoir illustrating the core attached thereto, in addition to the filtering element object of this invention shown in section; and FIG. 2—a top view of the filtering device object of this invention.

DETAILED DESCRIPTION OF THE FIGURES

As can be seen in details in FIG. 1, and also as known in the art, the filtering core 10 is attached to the lower inner portion of the upper reservoir 12 through a tubular projection 1a4, generally having a threaded wall, which extends partially outwardly from the lower portion of the lower wall of the reservoir 12 and fixed through a nut 15. The filtered water through the core walls 10 is directed through the tubular projection 14 into the lower reservoir 13 where it is accumulated to be consumed by being removed through a tap (not shown).

In order to improve the ability to filter the water in home water filters and overcome the drawbacks of using the core filled with carbon, it is envisaged, according to this invention, the positioning of a filtering device 1 at the core 10 output as can be seen in FIG. 1.

The filtering device 1 comprises basically a cup-shaped recipient 3 having a lid 4 which can be fitted to the recipient 3, the lid 4 also being provided with a joining member 8 for fixing the device 1 to the tubular projection 14 of the core 10.

The joining member 8 provided in the central portion of the lid 4 has a tubular shape and should have the inner diameter threaded and sized so that it can be threaded to the projection 14 of the core 10. Such member 8 traps the water previously filtered by the core 10 and conveys same to the filtering device 1. The joining member 8 should be constructed in such a way that it can be associated to the projection 14 of the core 10, and therefore, it may be attached through an inner or outer thread, or even by being fitted thereto. The recipient 3 should be filled up to almost the upper edge of activated carbon and the other elements that complement the filtration 2 of the water.

An extension 9 of the member 8 gets into the recipient 3 up to its lowest portion by penetrating the coal and other the filtering elements 2 therein.

Also, as can be seen from FIG. 2, a plurality of ribs 5 are radially disposed in the central portion of the lid 4, thus interconnecting the upper face thereof with the outer wall of the joining member 8 in order to structurally reinforce the whole assembly.

The functioning of the filtering device 1 object of this invention is optimal since the carbon and the other filtering elements 2 are fully utilized and actuate during the filtering operation. This occurs because the water is conveyed to the lowest portion of the recipient 3 through the extension 8 and directed towards the sides thereof and accumulating therein until its level reaches the water output opening 7 or multiple openings 7 provided in the upper portion of the side wall 6 of said recipient 3 and overflows into the lower reservoir 13. Thus, the water shall remain in contact with the carbon and the other elements 2 through the whole path 19 and the impurities thereof shall be retained more efficiently and longer when compared to the filtering types presently know. The openings 7 can also be provided on the lid 4 and be made from circular holes or tears.

Optionally, and depending on the type of carbon and other elements which complement the filtration 2, the recipient 3 can be provided in its inner cavity with a pervious membrane (not shown) the purpose of which is to retain same below the level of the openings 7.

Moreover, since it is adaptive to the water filters already in the market, the filtering device 1 can be used and replaced irrespective of both the need to replace the core 10 and the manufacturer that makes same, thus providing a cost-effective maintenance.

Another advantage resulting from the use of the device 1 object of this invention, is that a filter that has been common, begins to have a bactericide action in addition to eliminate agricultural defensives, heavy metal and other chemicals, for example, chlorine, which may be present in the water.

The material used for manufacturing the device object of this invention shall be preferably a plastic material, but it can be replaced by any other equivalent material.

Evidently, although a cylindrical filtering device 1, applicable to home water filters, has been described herein, the object of this invention can be applicable for the filtration of other fluids in other devices other than a home water filter and, moreover, it can evidently have further shapes other than cylindrical, and any other material other than activated carbon may be used therefor.

Although a preferred example of realization has been described, it should be understood that the scope of this invention encompasses other possible variations, being limited solely by the content of the accompanying claims, the possible equivalents being included therein.

What is claimed is:

1. A filtering device (1), for use with a filtering core (10) of a water filter, the device (1) comprising:
    a recipient (3) which comprises filtering elements (2), a joining member (8) having a joining portion for joining the filtering device (1) to a tubular projection (14) of the core (10), and said joining member (8) having an extension portion (9) extended into the recipient (3) to its lowest portion thus penetrating the filtering elements (2) therein and trapping the water previously filtered by the core (10), and said joining portion and extension portion being of a common tube member.

2. The device according to claim 1, wherein the recipient (3) is provided with a lid (4) having a joining member (8) that can be threaded to a threaded wall of the tubular projection (14) of the core (10).

3. The device according to claim 2, wherein the lid is provided with a plurality of water output openings.

4. The device according to claim 1, wherein the recipient comprises a lid (4), which lid is provided with at least one water output opening (7).

5. The device according to claim 4, wherein the lid and the recipient have a circular cross section.

6. The device according to claim 1, wherein the recipient comprises a lid, and the lid (4) and the recipient (3) have a circular cross section.

7. The device according to claim 1, wherein said filtering elements comprise carbon.

8. The device according to claim 1 wherein said joining portion has interior threads for connecting to exterior threads of the tubular projection of the core.

9. The device according to claim 1 wherein said joining member and recipient are dimensioned so as to have the recipient receive an outlet end of the tubular projection of the core when said joining member is joined with the core.

10. The device according to claim 1 wherein said extension portion has an inner diameter dimensioned for abutment with the tubular projection of the core when the joining member is joined with the core.

11. The device of claim 1 wherein the filtering elements received within said recipient extend axially along a side wall of said extension above a lower outlet opening in said extension.

12. The device of claim 1 wherein said recipient is filled with the filtering elements.

13. The device according to claim 1 wherein the recipient comprises a lid and a side wall provided with at least one water output opening in a lid fitting area of the recipient.

14. A filtering device, for use with a filtering core of a water filter, the device comprising:
    a recipient which comprises filtering elements, a joining member for joining the filtering device to a tubular projection of the core, said joining member having an extension extended into the recipient to its lowest portion thus penetrating the filtering elements therein and trapping the water previously filtered by the core, and
    wherein the recipient comprises a lid and a side wall, with the side wall provided with at least one water output opening in a lid fitting area of the recipient.

15. The device according to claim 14, wherein the lid is provided with the joining member, and said joining member has threads for threaded engagement with the tubular projection of the core.

16. The device according to claim 15, wherein the lid and the recipient have a circular cross section.

17. The device according to claim 14, wherein the lid and the recipient have a circular cross section.

18. A filtering apparatus for use with a water filter with an upper reservoir and a lower reservoir and a divider therebetween, said filtering apparatus comprising:
    a filtering core which is dimensioned for receipt in the upper reservoir, said filtering core having a tubular projection which is dimensioned for projecting within the divider;
    a filtering device having a recipient which comprises filtering elements and a joining member which joins said filtering device to said tubular projection, said joining member having an extension which extends down to a lowest portion of said recipient so as to penetrate the filtering elements held by said recipient so as to trap water previously filtered by said filtering core.

19. The apparatus of claim 18 wherein said recipient is provided with a lid and said joining member being fixed to said lid and having a threaded portion for threaded attachment to a corresponding threaded portion of said tubular projection.

20. The apparatus of claim 19 wherein said recipient is cup shaped and has a side wall provided with at least one water output opening in a fitting area of said lid.

21. The apparatus of claim 18 wherein said recipient is cup shaped and has a side wall and a lid and said side wall being provided with at least one water output opening in a fitting area of said lid.

22. The apparatus of claim 18 further comprising activated carbon contained within said recipient.

23. The apparatus according to claim 18 wherein an upper, exposed surface of a body of the filtering elements is at a level above an outlet end of said tubular projection.

24. The filtering apparatus of claim 18 wherein said filtering core is a porous ceramic core free of any filtering media.

25. A filtering assembly, comprising:

a water filter with an upper reservoir and a lower reservoir and a divider therebetween;

a filtering core which is received in the upper reservoir, said filtering core having a tubular projection which is dimensioned for projecting into the divider:

a filtering device having a recipient which comprises filtering elements and a joining member which joins said filtering device to said tubular projection, said joining member having an extension which extends down to a lowest portion of said recipient so as to penetrate the filtering elements held by said recipient so as to trap water previously filtered by said filtering core.

26. The assembly of claim 25 wherein said recipient is provided with a lid and said joining member being fixed to said lid and having a threaded portion for threaded attachment to a corresponding threaded portion of said tubular projection.

27. The assembly of claim 25 wherein said recipient is cup shaped and has a lid and a side wall with said side wall being provided with at least one water output opening in a fitting area of said lid.

28. The assembly according to claim 25 wherein an upper, exposed surface of a body of the filtering elements is at a level above an outlet end of said tubular projection.

* * * * *